(12) United States Patent
Jeon et al.

(10) Patent No.: US 12,118,827 B2
(45) Date of Patent: Oct. 15, 2024

(54) APPARATUS AND METHOD FOR DETECTING MOUNTING BEHAVIOR OF ANIMAL BASED ON IMAGE

(71) Applicant: INTFLOW INC., Gwangju (KR)

(72) Inventors: Kwang Myung Jeon, Gwangju (KR); So Heun Ju, Gwangju (KR)

(73) Assignee: INTFLOW INC., Gwangju (KR)

( * ) Notice: Subject to any disclaimer, the term of this patent is extended or adjusted under 35 U.S.C. 154(b) by 338 days.

(21) Appl. No.: 17/702,406

(22) Filed: Mar. 23, 2022

(65) Prior Publication Data

US 2023/0070719 A1    Mar. 9, 2023

(30) Foreign Application Priority Data

Aug. 10, 2021    (KR) .................. 10-2021-0105287

(51) Int. Cl.
| | |
|---|---|
| *G06V 40/10* | (2022.01) |
| *A01K 29/00* | (2006.01) |
| *G06V 10/25* | (2022.01) |
| *G06V 40/20* | (2022.01) |

(52) U.S. Cl.
CPC ............ *G06V 40/23* (2022.01); *A01K 29/005* (2013.01); *G06V 10/25* (2022.01); *G06V 40/10* (2022.01)

(58) Field of Classification Search
None
See application file for complete search history.

(56) References Cited

U.S. PATENT DOCUMENTS

| | | | |
|---|---|---|---|
| 6,191,798 B1 * | 2/2001 | Handelman | G06T 13/40 345/475 |
| 2017/0046567 A1 * | 2/2017 | Hong | A61B 5/167 |

FOREIGN PATENT DOCUMENTS

| | | | | |
|---|---|---|---|---|
| KR | 101769963 | | 8/2017 | |
| KR | 20210054266 | | 5/2021 | |
| WO | WO-2016168869 A1 * | | 10/2016 | A61B 5/11 |

* cited by examiner

*Primary Examiner* — Tsung Yin Tsai
(74) *Attorney, Agent, or Firm* — CANTOR COLBURN LLP

(57) ABSTRACT

An apparatus for detecting mounting behavior of an animal object includes: a memory that stores a program; and a processor that executes the program. The program extracts animal detection information about an animal object detected from the image by inputting the received image into an animal detection model. Also, the program extracts bounding boxes of which a distance between coordinates of central points is smaller than a first set value, bounding boxes of which a difference in rotational angle is smaller than a second set value, and bounding boxes of which a difference between a vector connecting the central points of the extracted bounding boxes and an orientation of each bounding box is smaller than a third set value. If activity information of the animal object is extracted based on an MHI of the image, it is determined that mounting behavior occurs.

10 Claims, 20 Drawing Sheets

| ATTRIBUTE | FORM | VARIABLE | RANGE |
|---|---|---|---|
| rbbox | {xc, yc, w, h, theta} | $R$ | xc, yc, w, h = [COORDINATE RANGE]<br>theta = [-pi/2~pi/2] |
| keypoint | {(x1,y1), (x2,y2), ... (xn,yn)} | $K$ | COORDINATE RANGE |
| class | c | $c$ | CLASS INDEX, INTEGER OF 0 OR MORE |
| pose | p | $p$ | CLASS INDEX, INTEGER OF 0 OR MORE |

APPARATUS AND METHOD FOR DETECTING MOUNTING BEHAVIOR OF ANIMAL BASED ON IMAGE

TECHNICAL FIELD

The present disclosure relates to an apparatus and method for detecting mounting behavior of an animal based on an image.

BACKGROUND

With recent advances in image processing and various IT technologies, a system capable of automatically monitoring the condition of an animal in a shed or the like is being actively developed. In particular, a technique of automatically recognizing each animal object and automatically classifying the behavior of the animal object by using CCTV images is being developed.

However, it is difficult to accurately detect a plurality of dynamically moving animals by such an image processing technique alone.

In particular, if mounting behavior of a livestock animal such as a cow can be detected automatically, it can be greatly helpful for stockbreeding farmhouses. That is, since cows show estrus for a limited period of time, automatic detection of estrus and appropriate response thereto can provide a significant contribution to an increase in production of livestock.

Conventionally, various methods for detecting mounting behavior have been developed for this purpose. A method for detecting mounting behavior of a cow using a motion history image (MHI) is known as a representative method. However, this method uses only the number of pixels of MHI. Thus, if there are many cows in a shed, it is difficult to accurately detect where and which cow is doing mounting behavior. Also, any motion of a cow can be misrecognized as mounting behavior.

In order to solve the problem of the conventional technology, according to the present disclosure, each object is detected using a bounding box and mounting behavior is detected using information about the detected bounding box.

According to a conventional technology known as a universal object detection technology, detection information about an object of interest is represented by an axis-aligned bounding box. Such a bounding box can usually be used to detect an animal object in most cases. However, if the object is d with an axis, a broad background area, which does not actually correspond to the object, can be overestimated as an object area.

FIG. 1 shows an example where a conventional object detection method is applied.

According to the conventional technology, how much the orientation of an object in an image is aligned with a horizontal axis or a vertical axis affects accuracy in object detection. As shown in FIG. 1, it can be seen that when an object is aligned diagonally, a bounding box larger than the actual object can be created. In particular, if a plurality of animals of the same class is crowded and overlaps each other, a detection area for each animal may be overestimated, which may result in a great decrease in detection accuracy for each of the crowded animals.

To solve this problem, the present disclosure proposes a new object detection method specialized for animal detection which can be used for detecting mounting behavior of a cow.

PRIOR ART DOCUMENT

Korean Patent No. 10-1769963 (entitled "Detecting system for mounting of cow")

SUMMARY

In view of the foregoing, the present disclosure is conceived to provide an apparatus and method for detecting mounting behavior of an animal based on an image by which a bounding box trained to be suitable for an animal object is created, and, thus, its mounting behavior can be detected.

However, the problems to be solved by the present disclosure are not limited to the above-described problems. There may be other problems to be solved by the present disclosure.

A first aspect of the present disclosure provides an apparatus for detecting mounting behavior of an animal object based on an image, including: a communication module that receives an image of a target object; a memory that stores therein a program configured to detect mounting behavior of an animal object from the received image; and a processor that executes the program. Herein, the program configured to detect mounting behavior extracts animal detection information about an animal object detected from the image by inputting the received image into an animal detection model that is trained based on learning data composed of animal images. The animal detection information includes a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body. The program extracts, from the received image, bounding boxes of which a distance between the coordinates of the central points is smaller than a first set value, from the extracted bounding boxes, bounding boxes of which a difference in rotational angle is smaller than a second set value, and bounding boxes of which a difference between a vector connecting the central points of the extracted bounding boxes and an orientation of each bounding box is smaller than a third set value. If activity information of the animal object is extracted based on a motion history image (MHI) of the image from which the extracted bounding boxes are detected, it is determined that mounting behavior occurs in an animal object specified by the bounding boxes.

A second aspect of the present disclosure provides an apparatus for detecting mounting behavior of an animal object based on an image, including: a communication module that receives an image of a target object; a memory that stores therein a program configured to detect mounting behavior of an animal object from the received image; and a processor that executes the program. The program configured to detect mounting behavior extracts animal detection information about an animal object detected from the image by inputting the received image into an animal detection model that is trained based on learning data composed of animal images. The animal detection information includes a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body. The program detects mounting behavior by inputting the extracted animal detection information into a decision tree-based mounting behavior detection model. The mounting behavior detection model is trained to detect mounting behavior based on learning data including a distance between the coordinates of the central points of the bounding boxes, rotational angles of the bounding boxes, a vector connecting the central points of the bounding boxes and activity information of the animal object based on a motion history image (MHI) of the image from which the bounding boxes are detected.

A third aspect of the present disclosure provides a method for detecting mounting behavior of an animal object by using an apparatus for detecting mounting behavior of an animal object based on an image, including: a process of extracting animal detection information by inputting an image of a target object into an animal detection model that is trained based on learning data composed of animal images, the animal detection information including a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body; a process of extracting, from the received image, bounding boxes of which a distance between the coordinates of the central points is smaller than a first set value; a process of extracting, from the extracted bounding boxes, bounding boxes of which a difference in rotational angle is smaller than a second set value; a process of extracting bounding boxes of which a difference between a vector connecting the central points of the extracted bounding boxes and an orientation of each bounding box is smaller than a third set value; and a process of extracting activity information of the animal object based on a motion history image (MHI) of the image from which the extracted bounding boxes are detected. If the activity information of the animal object is extracted, it is determined that mounting behavior occurs in an animal object specified by the bounding boxes.

A fourth aspect of the present disclosure provides a method for detecting mounting behavior of an animal object by using an apparatus for detecting mounting behavior of an animal object based on an image, including: a process of extracting animal detection information by inputting an image of a target object into an animal detection model that is trained based on learning data composed of animal images, the animal detection information including a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body; and a process of detecting mounting behavior by inputting the extracted animal detection information into a decision tree-based mounting behavior detection model. The mounting behavior detection model is trained to detect mounting behavior based on learning data including a distance between the coordinates of the central points of the bounding boxes, rotational angles of the bounding boxes, a vector connecting the central points of the bounding boxes and activity information of the animal object based on a motion history image (MHI) of the image from which the bounding boxes are detected.

According to an embodiment of the present disclosure, unlike the conventional object detection technology, a bounding box can be created in consideration of a rotational direction of an animal object, and, thus, it is possible to greatly improve the detection accuracy for crowded livestock. Also, mounting behavior of an animal object can be detected based on the created bounding box. Therefore, it is possible to accurately detect mounting behavior even in an environment in which a number of objects are gathered.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
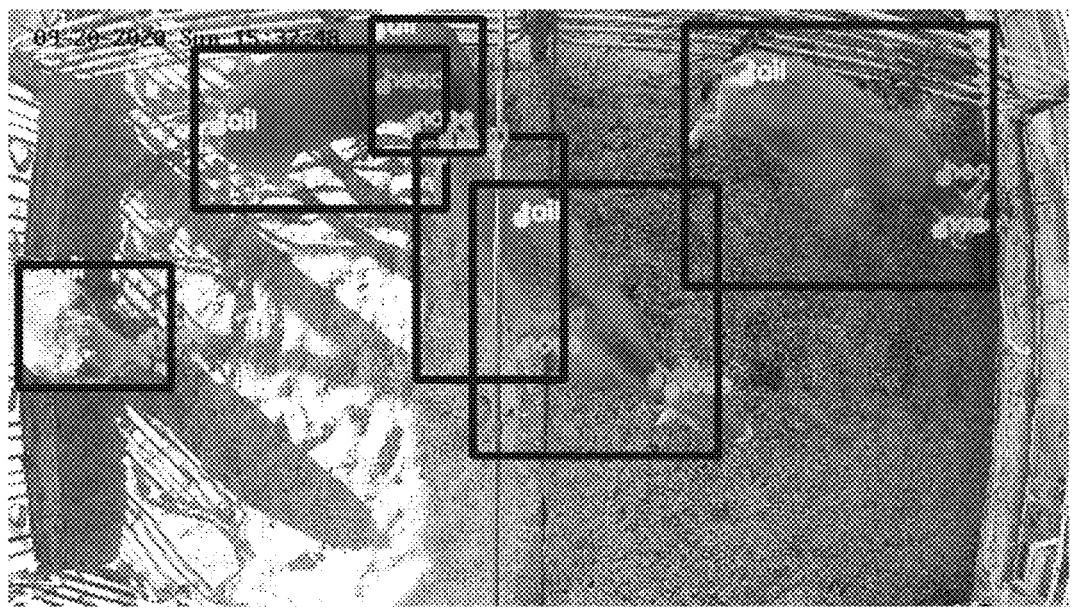
FIG. 1 shows an example where a conventional object detection method is applied.

Hereafter, embodiments of the present disclosure will be described in detail with reference to the accompanying drawings. However, it is to be noted that the present disclosure is not limited to the embodiments but can be embodied in various other ways. Also, the accompanying drawings are provided to help easily understand the embodiments of the present disclosure and the technical conception described in the present disclosure is not limited by the accompanying drawings. In the drawings, parts irrelevant to the description are omitted for the simplicity of explanation, and the size, form and shape of each component illustrated in the drawings can be modified in various ways. Like reference numerals denote like parts through the whole document.

Suffixes "module" and "unit" used for components disclosed in the following description are merely intended for easy description of the specification, and the suffixes themselves do not give any special meaning or function. Further, in the following description of the present disclosure, a detailed explanation of known related technologies may be omitted to avoid unnecessarily obscuring the subject matter of the present disclosure.

Throughout this document, the term "connected to (contacted with or coupled to)" may be used to designate a connection or coupling of one element to another element and includes both an element being "directly connected to (contacted with or coupled to)" another element and an element being "electronically connected to (contacted with or coupled to)" another element via another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Further, in describing components of the present disclosure, ordinal numbers such as first, second, etc. can be used only to differentiate the components from each other, but do not limit the sequence or relationship of the components. For example, a first component of the present disclosure may also be referred to as a second component and vice versa.

Figure 2:
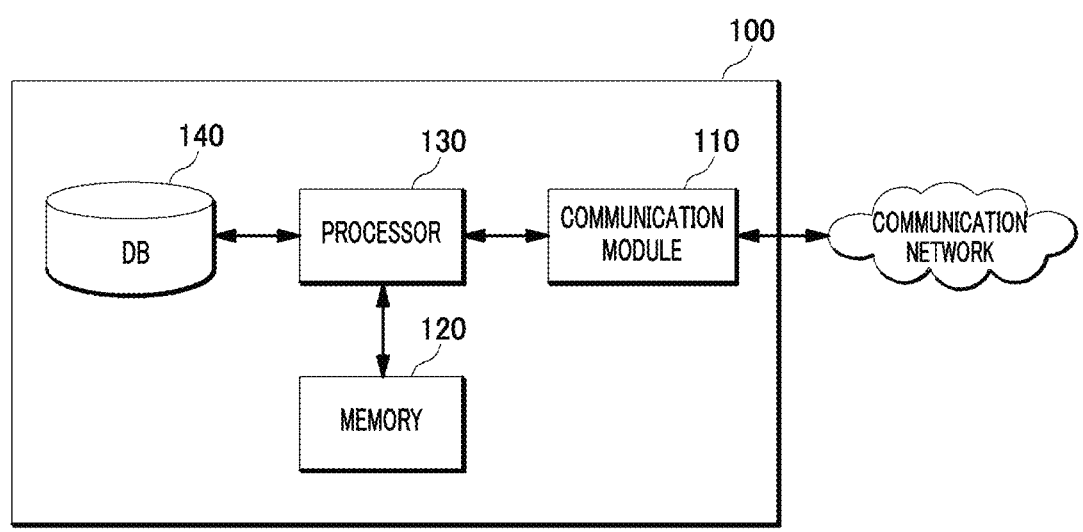
FIG. 2 is a block diagram illustrating a configuration of an apparatus for detecting mounting behavior of an animal based on an image according to an embodiment of the present disclosure.

FIG. 2 is a block diagram illustrating a configuration of an apparatus for detecting mounting behavior of an animal based on an image according to an embodiment of the present disclosure.

Referring to FIG. 2, an apparatus 100 for detecting mounting behavior of an animal based on an image (hereinafter, referred to as "apparatus 100") includes a communication module 110, a memory 120 and a processor 130. The apparatus 100 may also include a database 140. The apparatus 100 receives images from a plurality of CCTVs installed at a shed in real time, detects an animal object by using the received images, and detects mounting behavior of the animal object.

To this end, the apparatus 100 may be implemented with a computer or portable device which can access a server or another device through a network. Herein, the computer may include, for example, a notebook, a desktop and a laptop equipped with a WEB browser. The portable devices may be, for example, a wireless communication device that ensures portability and mobility and may include all kinds of handheld-based wireless communication devices such as various smart phones, tablet PCs, smart watches, and the like.

The term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

The communication module 110 receives images of a target object from one or more cameras. Herein, the target object may include various classes of animal objects such as cows, pigs and dogs. The communication module 110 may include hardware and software required to transmit and receive a signal, such as a control signal or a data signal, through wired/wireless connection with other network devices.

The memory 120 stores therein a program configured to detect mounting behavior of an animal object from the images received through the communication module 110. Herein, the program configured to extract animal detection information extracts the animal detection information by inputting the received images into an animal detection model that is trained based on learning data composed of animal images. Details of the animal detection information will be described later. Also, the program detects whether mounting behavior occurs in the animal object by using information about a bounding box included in the extracted animal detection information. Further, if activity information of the animal object is extracted based on a motion history image (MHI) of the image from which the bounding box is detected, the program determines that mounting behavior occurs.

Herein, the memory 120 may collectively refer to a non-volatile storage device that retains information stored therein even when power is not supplied and a volatile storage device that requires power to retain information stored therein. The memory 120 may function to temporarily or permanently store data processed by the processor 130. The memory 120 may include magnetic storage media or flash storage media in addition to the volatile storage device that requires power to retain information stored therein, but the present disclosure is not limited thereto.

The processor 130 executes the program configured to extract the animal detection information stored in the memory 120 and outputs the animal detection information about the target object as a result of execution.

In an example, the processor 130 may be implemented as a microprocessor, a central processing unit (CPU), a processor core, a multiprocessor, an application-specific integrated circuit (ASIC) or a field programmable gate array (FPGA), but the scope of the present disclosure is not limited thereto.

The database 140 may store therein images taken with the cameras and received through the communication module 110 or various data for training of the animal detection model. In particular, different cameras may be installed at different locations of each shed, and images taken with the respective cameras installed at each shed may be distinguished and separately stored in the database 140. Also, the database 140 accumulatively stores the animal detection information extracted by the program configured to detect mounting behavior of an animal object and the mounting behavior detection result, and the animal detection information can be used in various applications for monitoring the condition of an animal.

Figures 3, 4:
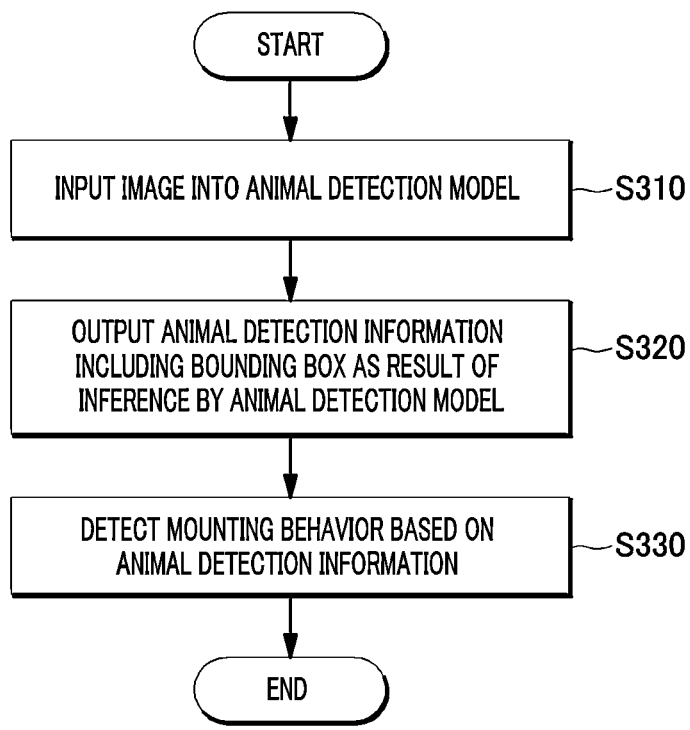
FIG. 3 is a flowchart illustrating a method for detecting mounting behavior of an animal object according to an embodiment of the present disclosure.
FIG. 4 and FIG. 5 are provided to explain animal detection information extracted by the apparatus for detecting mounting behavior of an animal based on an image according to an embodiment of the present disclosure.

FIG. 3 is a flowchart illustrating a method for detecting mounting behavior of an animal object according to an embodiment of the present disclosure.

First, the received images are input into the animal detection model that is trained based on learning data composed of animal images (S310).

Then, animal detection information including a bounding box is extracted as a result of inference by the animal detection model (S320).

Herein, the animal detection information includes a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body. Details of the process of extracting the animal detection information will be described with reference to FIG. 4 through FIG. 11.

Figure 5:
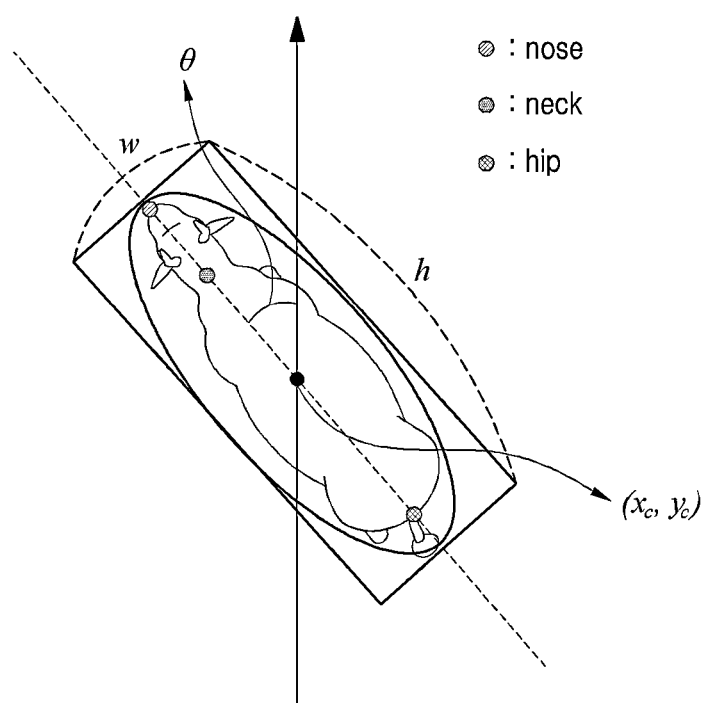

FIG. 4 and FIG. 5 are provided to explain animal detection information extracted by the apparatus for detecting mounting behavior of an animal based on an image according to an embodiment of the present disclosure.

The animal detection information includes, as information about a bounding box (rbbox) created to be suitable for an animal object detected from an image, coordinates (xc, yc) of a central point of the bounding box, a width (w) of the bounding box, a length (h) of the bounding box and a rotational angle (theta) of the bounding box with respect to a reference axis.

Also, the animal detection information includes, as position information indicating keypoints of the animal object, a position (x1, y1) of the end of the head of the animal object, a position (x2, y2) of the neck and a position (x3, y3) of the end of the body.

The animal detection information may further include information about the class of the animal object detected from the image and information about a pose of the animal object. The information about the class of the animal object may distinguish different species of animals and different growth stages of the same species. For example, pigs can be classified into suckling pigs, weaning pigs, growing pigs, fed pigs, candidate pigs, pregnant pigs and farrowing pigs. Also, the information about a pose of the animal object may distinguish various poses such as sitting, standing, mounting behavior, rollover, and dog sitting.

Examples of the animal detection information can be seen more clearly from FIG. 5. As described above, the bounding box of the present disclosure is created in consideration of the degree of rotation of the axis of the animal object as a detection target, and, thus, the bounding box can be optimized for the size of the animal object.

FIG. 6 is provided to explain a difference between a bounding box of a conventional technology and a bounding box of the present disclosure.

Figure 6A:
FIG. 6A and FIG. 6B are provided to explain a difference between a bounding box of a conventional technology and a bounding box of the present disclosure.
Figure 6B:
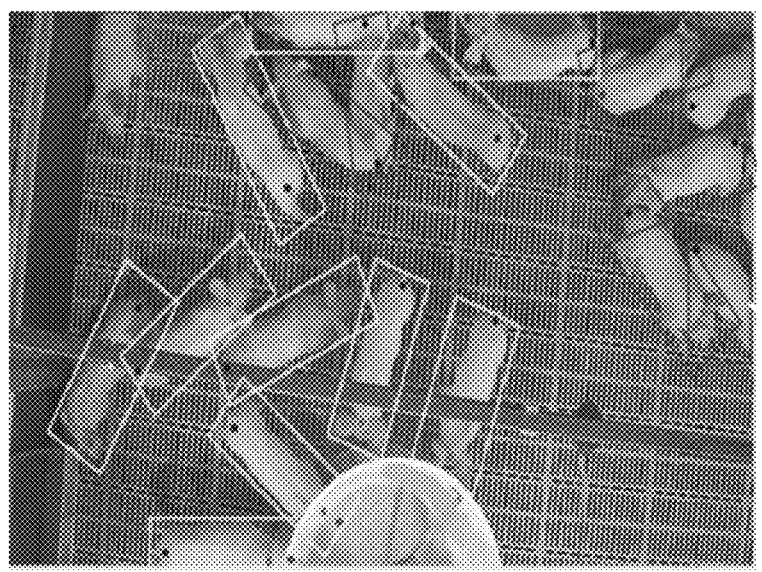

As shown in FIG. 6, it can be seen that according to the conventional technology (FIG. 6A), a bounding box is created in a state where it is not aligned with the axis of each object, whereas according to the present disclosure (FIG. 6B), a bounding box is created in consideration of the degree of rotation of the axis of each object, and, thus, the areas for the objects are generally uniform in size.

Hereafter, an animal detection model that creates such animal detection information will be described.

Figure 7:
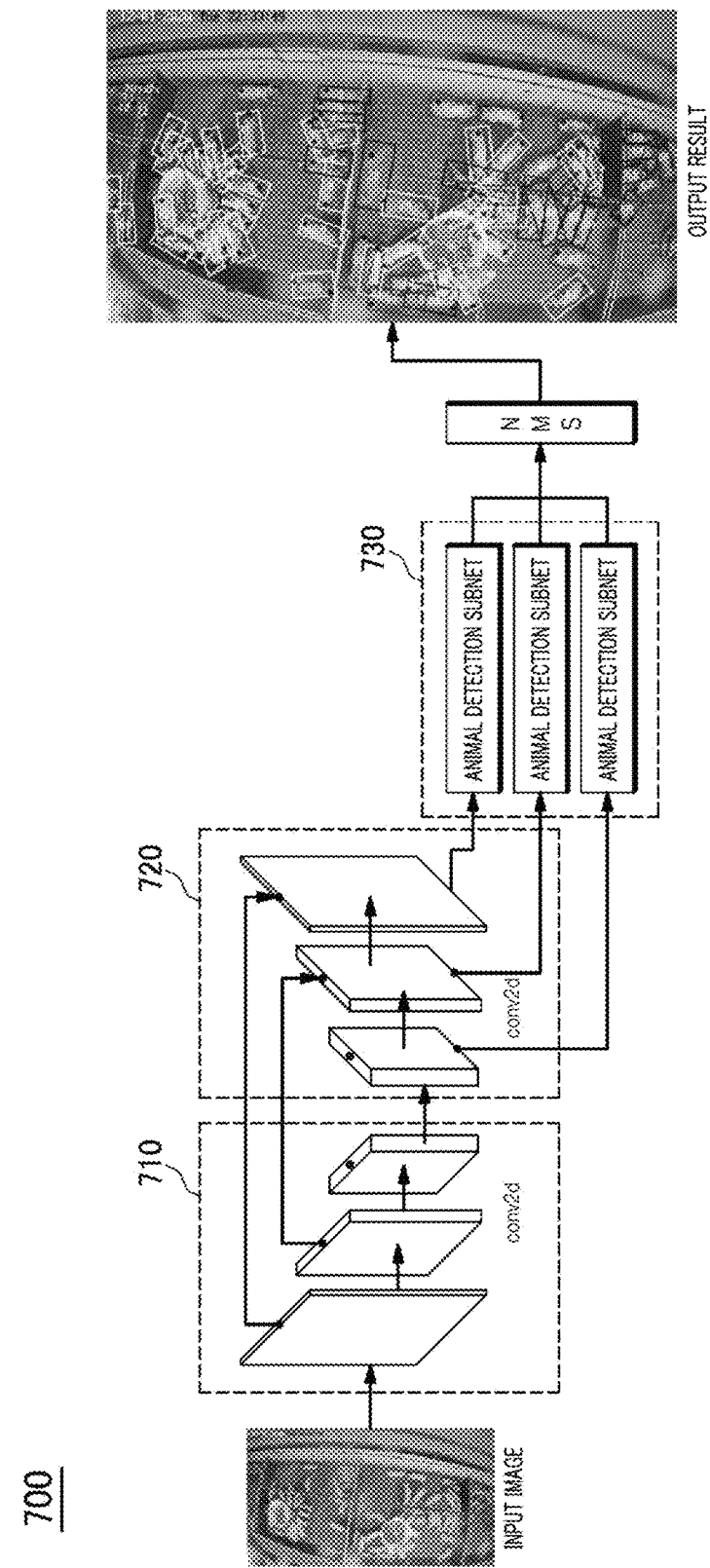
FIG. 7 through FIG. 9 are provided to explain an animal detection model of the apparatus for detecting mounting behavior of an animal based on an image according to an embodiment of the present disclosure.
Figure 8:
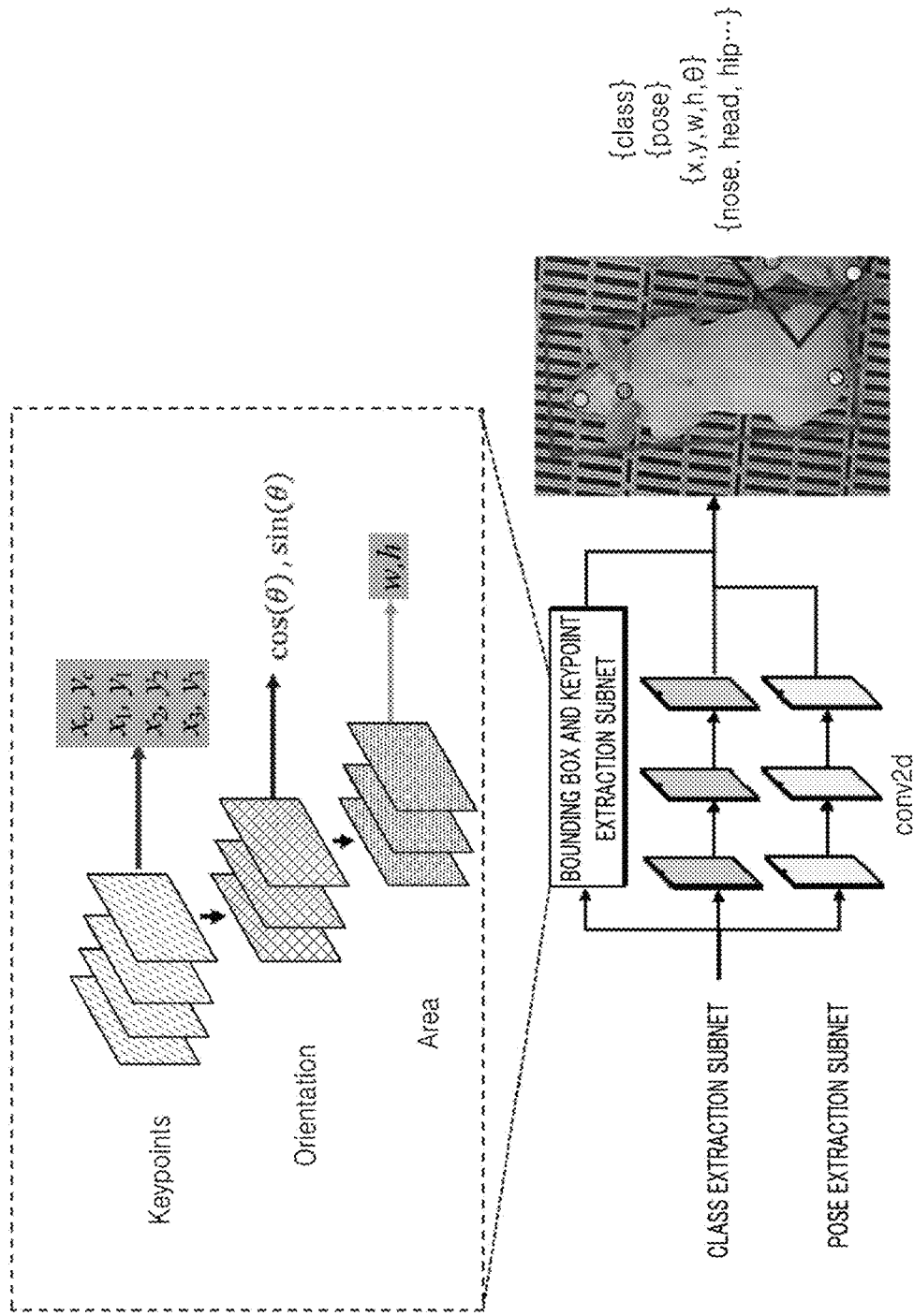
Figure 9:
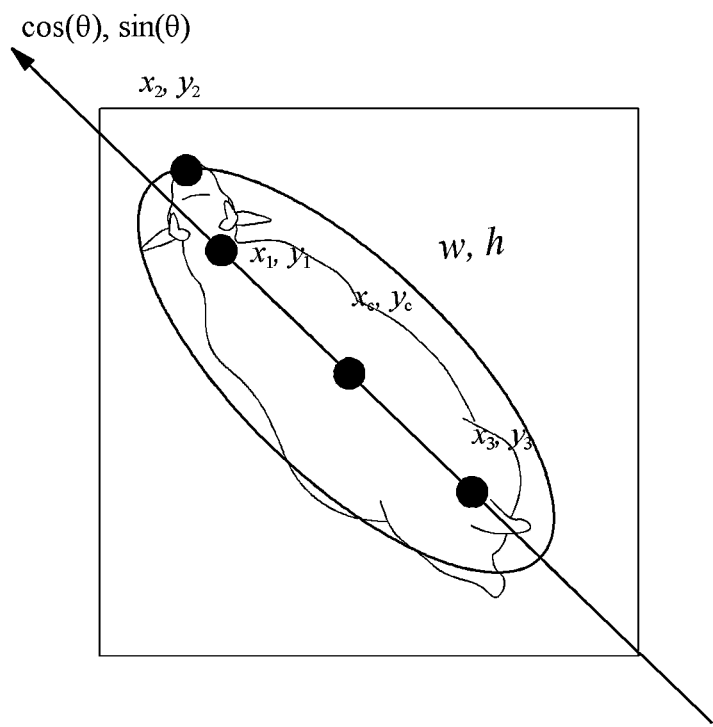

FIG. 7 through FIG. 9 are provided to explain an animal detection model of the apparatus for detecting mounting behavior of an animal based on an image according to an embodiment of the present disclosure.

An animal detection model 700 used in the present disclosure is constructed based on learning data in which a plurality of images including at least one animal object is matched with animal detection information about animal objects included in each image. The animal detection model 700 is trained through a training process and then automatically outputs animal detection information in response to an actually input image through an inference process on the input image.

The animal detection model 700 includes a backbone 710, a neck 720 and a head 730.

The backbone 710 is a component configured to extract a feature from the input image and commonly used for deep neural network-based image analysis and processing. The backbone 710 is mainly configured as a stack of 2D convolution layers as illustrated in FIG. 7, and has been improved to have various neural network structures in order to improve the efficiency thereof. Backbones of various structures commonly function to receive an image and extract intermediate information. The intermediate information is delivered to the neck 720.

The neck 720 collects the intermediate information from each layer of the backbone 710 based on the feature extracted by the backbone 710. The neck 720 is a lower neural network forming a universal object detector and functions to collect the intermediate information from each layer of the backbone 710 and analyze the intermediate information. The image analyzed in each layer has different resolutions. Thus, if a target object is a long or short distance away, the neck 720 extracts intermediate information from each layer to effectively detect animals of various sizes and provides the intermediate information to the head 730. The neck 720 may have various configurations depending on the form of the backbone 710. Specifically, the number of layers of a neural network forming the neck 720 and a hyperparameter for each layer may vary depending on the form of the backbone 710.

The head 730 outputs animal detection information based on the intermediate information collected by the neck 720. The head 730 receives the intermediate information acquired by the neck 720 and outputs animal detection information. The head 730 receives the intermediate information from each layer of the neck 720 and outputs the animal detection information recognized by each layer. In particular, the head 730 of the present disclosure includes a plurality of animal detection subnets, and each animal detection subnet includes a subnet for extracting a bounding box and a keypoint, a subnet for extracting a class of an animal and a subnet for extracting a pose of an animal as shown in FIG. 8.

Meanwhile, a non-maximum suppression (NMS) module may be further coupled to an output end of the head 730. The NMS refers to an algorithm for selecting a bounding box with the highest similarity when several bounding boxes are created for the same object. Since it is a conventional technology, a detailed description thereof will be omitted.

The subnet for extracting a bounding box and a keypoint is composed of cascaded multi-lane deep convolutional networks. The cascaded multi-lane deep convolutional networks are constructed according to a causal order for extracting a bounding box and a keypoint for a given animal image. A piece of animal detection information is defined from each image according to the following causal order.

That is, as shown in FIG. 9, a central point (xc, yc) and major points ((x1, y1), (x2, y2), (x3, y3)) are marked first. Then, a tangent line passing through the central point and one or more of the major points is drawn. Finally, an area (plane) with the tangent line passing through its center is defined.

In the cascaded multi-lane deep convolutional networks constructed as described above, information is delivered according to the causal order and each information is output. That is, a first lane outputs the central point and the keypoint, a second lane outputs a direction (theta) of the tangent line, and a third lane outputs a width and a height of the area including the tangent line and the central point.

Meanwhile, each of the subnet for extracting a class of an animal and the subnet for extracting a pose of an animal is obtained through a general structure, i.e., a single-lane deep convolutional network.

The animal detection model can also be represented by the following equations.

$$E(A)=M(I)$$

$$M(x)=H(N(B(x)))$$

Herein, A={R,K,c,p} refers to vectorized animal detection information, M(x) refers to an animal detection model, I refers to an input image matrix (with a dimension of image width×image height×image channel), and E(A) refers to encoded animal detection information. Also, B(x), N(x) and H(x) represent the backbone 710, the neck 720 and the head 730, respectively.

The output in response to the input of the input image matrix into the animal detection model M(x) is trained to be identical to the encoded animal detection information E(A), and the animal detection model is constructed through a process of repeatedly updating the weight of the animal detection model by backpropagation learning.

The learning data used in the training process of the animal detection model include a plurality of images and animal detection information matched with each image. Herein, the animal detection information is manually extracted from each image. That is, when an operator sees each image, the operator may use an appropriate SW tool to directly input animal detection information, or animal detection information may be automatically input by an already developed animal detector and then corrected or supplemented by the operator. For example, the operator displays a bounding box in consideration of a rotational direction of an animal object with respect to a reference axis for each animal object included in an image and creates coordinates of a central point of each bounding box, a width of the bounding box, a length of the bounding box and a rotational angle of the bounding box with respect to a reference axis. Also, the operator extracts information about the class or pose of the animal object and uses the information as learning data.

The animal detection information included in the learning data is encoded before being used in the training process.

Herein, the animal detection information may be encoded through the following process.

First, an area of interest ($\hat{R}_\alpha$) is defined for each head 730. Herein, the number of areas of interest ($\hat{R}_\alpha$) is defined by processing area for each head 730×type of size×type of angle×box ratio.

Also, the degree of overlap ($O_{\alpha,k}$) between an animal area and an area of interest included in the animal detection information (A) is calculated by the following equation.

$$o_{\alpha,k}=I_oU(\hat{R}_\alpha,R_k)$$

Herein, the degree of overlap IoU(x,y) between two bounding boxes is calculated.

Then, only an animal area ($R_k$) with the highest degree of overlap with each area of interest is selected. Herein, $k'=\operatorname{argmax}_k(o_{\alpha,k})$.

Thereafter, the area of interest and the animal area corresponding thereto area encoded.

$$E(A)=\forall_\alpha[e_R(R_k,\hat{R}_\alpha),e_K(K_k,\hat{R}_\alpha),c_\alpha,p_\alpha]$$

Herein, $e_R(R, \hat{R})$ is processed as follows.

When R=[$x_c$, $y_k$, ω, h, θ] and $\hat{R}=[\hat{x}_c, \hat{y}_c, \hat{\omega}, \hat{h}, \hat{\theta}]$, $e_R(R, \hat{R})$ is processed as $$\bar{x}_c=(x_c-\hat{x}_c)/\hat{\omega}$$

$$\bar{y}_c=(y_c-\hat{y}_c)/\hat{h}$$

$$\bar{\omega}=\log(\omega/\hat{\omega})$$

$$\bar{h}=\log(h/\hat{h})$$

Accordingly, the output is as follows.

$$\bar{R}=[\bar{x}_c, \bar{y}_c, \bar{\omega}, \bar{h}, \sin(\theta), \cos(\theta)]=e_R(R,\hat{R})$$

Likewise, $e_K(K, \hat{R})$ is processed as follows.

When K=[$x_1$, $y_1$, $x_2$, $y_2$, ...] and $\hat{R}=[\hat{x}_c, \hat{y}_c, \hat{\omega}, \hat{h}, \hat{\theta}]$, $e_K(K, \hat{R})$ is processed as $$\bar{x}_1=(x_1-\hat{x}_c)/\hat{\omega}$$

$$\bar{y}_1=(y_1-\hat{y}_c)/\hat{h}$$

$$\bar{x}_2=(x_2-\hat{x}_c)/\hat{\omega}$$

$$\bar{y}_2=(y_2-\hat{y}_c)/\hat{h} \ldots$$

Accordingly, the output is as follows.

$$\bar{K}=[\bar{x}_1, \bar{y}_1, \bar{x}_2, \bar{y}_2, \ldots]=e_K(K,\hat{R})$$

The detection information encoded through the above-described process is used for constructing the animal detection model.

Meanwhile, the animal detection model is trained, backpropagation learning may be used. That is, a loss value between the encoded animal detection information and its estimate is calculated and a neural network parameter forming the animal detection model is updated repeatedly to reduce the loss value. For example, when a loss value between the bounding box (rbbox) and the keypoints of the animal object is calculated, a loss L1 or L2 may be used, and when a loss value for the class (c) of the animal object or the pose (p) of the animal object is calculated, a discrimination loss such as binary cross entropy loss or focal loss may be used.

The training is repeated by using the loss function until the sum of losses decreases below a target value to construct the animal detection model.

A process of inferring animal detection information (A) from the input image by using the animal detection model (M(x)) constructed as described above will be described. This can be represented by the following equation.

$$E(A)=M(I)$$

That is, when the input image is input into the animal detection model, the encoded detection information (E(A)) can be acquired. Then, the encoded detection information is decoded.

When $E(A)=\forall_\alpha[R_\alpha, K_\alpha, c_\alpha, p_\alpha]$, only values for $c_\alpha$ higher than a threshold value are left. In other words, α'=α if $c_\alpha$>thr. Herein, thr represents a detection threshold value.

Then, decoded animal detection area and keypoint information are acquired by processing $d_R(\bar{R}_{\alpha'}, \hat{R}_{\alpha'})$ and $d_K(\bar{K}_{\alpha'}, \hat{R}_{\alpha'})$, respectively. Herein, $d_R(\bar{R}_{\alpha'}, \hat{R}_{\alpha'})$ is processed as follows.

When $\overline{R}=[\overline{x}_c, \overline{y}_c, \overline{\omega}, \overline{h}, \sin(\theta), \cos(\theta)]$ and $\hat{R}=[\hat{x}_c, \hat{y}_c, \hat{\omega}, \hat{h}, \hat{\theta}]$, $d_R(R_{\alpha'}, R_{\alpha'})$ is processed as $$x_c = \overline{x}_c \hat{\omega} + \hat{x}_c$$

$$y_c = \overline{y}_c \hat{h} + \hat{y}_c$$

$$\omega = \exp(\overline{\omega})\hat{\omega}$$

$$h = \exp(\overline{h})\hat{h}$$

$$\theta = \alpha \tan(\sin(\theta)/\cos(\theta)).$$

Accordingly, the output is as follows.

$$R=[x_c, y_c, \omega, h, \theta] = d_R(\overline{R\alpha'}, \hat{R}\alpha')$$

Likewise, $d_K(\overline{K}_{\alpha'}, \hat{R}_{\alpha'})$ is processed as follows.

When $\overline{K}=[\overline{x}_1, \overline{y}_1, \overline{x}_2, \overline{y}_2 \ldots]$ and $\hat{R}=[\hat{x}_c, \hat{y}_c, \hat{\omega}, \hat{h}, \hat{\theta}]$, $d_K(K_{\alpha'}, R_{\alpha'})$ is processed as $$x_1 = \overline{x}_1 \hat{\omega} + \hat{x}_1$$

$$y_1 = \overline{y}_1 \hat{h} + \hat{y}_1$$

$$x_2 = \overline{x}_2 \hat{\omega} + \hat{x}_2$$

$$y_2 = \overline{y}_2 \hat{h} + \hat{y}_2 \ldots$$

Accordingly, the output is as follows.

$$K=[x_1, y_1, x_2, y_2, \ldots] = d_K(\overline{K}_\alpha, \hat{R}_{\alpha'})$$

The animal detection information (R, K, c, p) output through the above-described decoding process may include a number of pieces of overlapping information for a single animal object. To solve this problem, an algorithm for removing overlapping animal detection information may be applied.

To visually check the animal detection information, the animal detection information may be displayed as being overlaid on the image.

Figure 10:
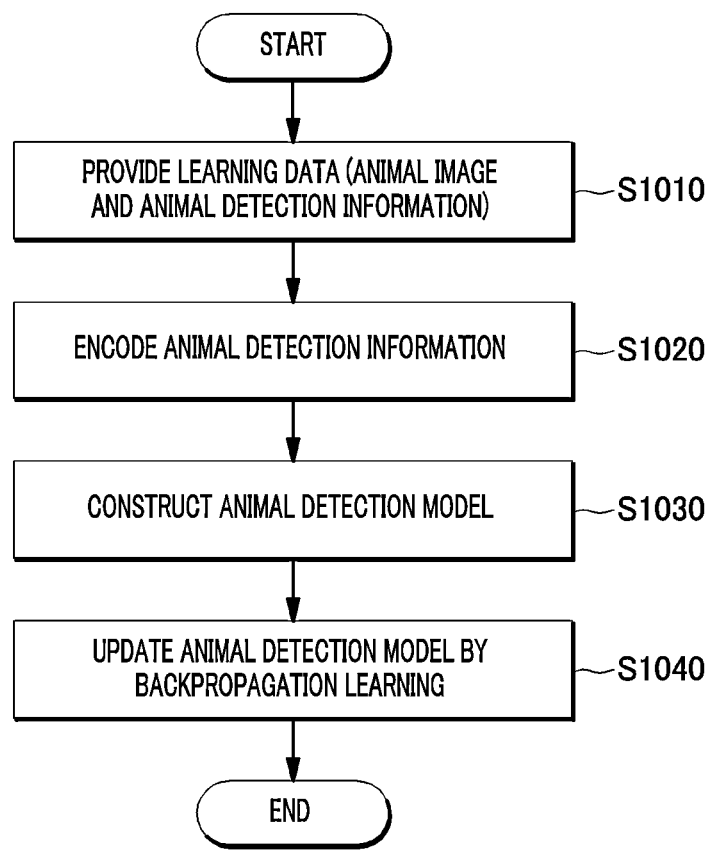
FIG. 10 is a flowchart illustrating a process of constructing an animal detection model according to an embodiment of the present disclosure.
Figure 11:
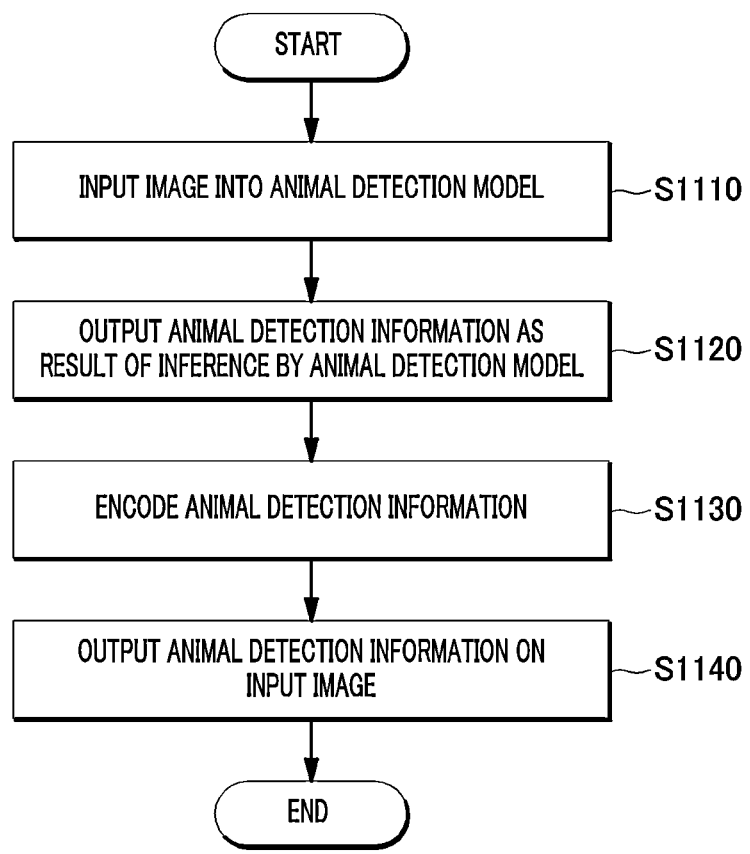
FIG. 11 is a flowchart illustrating an inference process using the animal detection model according to an embodiment of the present disclosure.

FIG. 10 is a flowchart illustrating a process of constructing an animal detection model according to an embodiment of the present disclosure, and FIG. 11 is a flowchart illustrating an inference process using the animal detection model according to an embodiment of the present disclosure.

Referring to FIG. 10, a plurality of animal images and animal detection information for each animal object included in each animal image are provided as learning data (S1010).

Herein, the animal detection information is encoded through the above-described process (S1020), and the encoded animal detection information is matched with each animal image and then input into the animal detection model.

The animal detection model is constructed based on the learning data input as described above (S1030).

Herein, the animal detection model includes the backbone 710 configured to extract a feature from the input image, the neck 720 configured to collect intermediate information from each layer of the backbone 710 based on the feature extracted by the backbone 710, and the head 730 configured to output animal detection information based on the intermediate information collected by the neck 720.

Then, a process of updating the animal detection model by backpropagation learning is performed repeatedly (S1040).

Thereafter, referring to FIG. 11, an input image that needs to be inferred is input into the animal detection model (S1110). The input image may be recorded in real time by a CCTV.

Then, animal detection information is output as a result of inference by the animal detection model (S1120).

Since the output animal detection information is encoded information, it is decoded (S1130). The decoding process is the same as described above.

The output animal detection information is displayed as being overlaid on the input image (S1140).

Details of the process of extracting the animal detection information has been described above.

Referring to FIG. 3 again, mounting behavior of an animal object is detected based on the animal detection information extracted as described above (S330). Herein, the animal detection information includes a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body.

In the present disclosure, two methods may be used to detect mounting behavior. A first method is a method of sequentially performing processes shown in FIG. 12, and a second method is a method using a decision tree-based mounting behavior detection model presented in FIG. 22.

Hereafter, the first method will be described.

Figure 12:
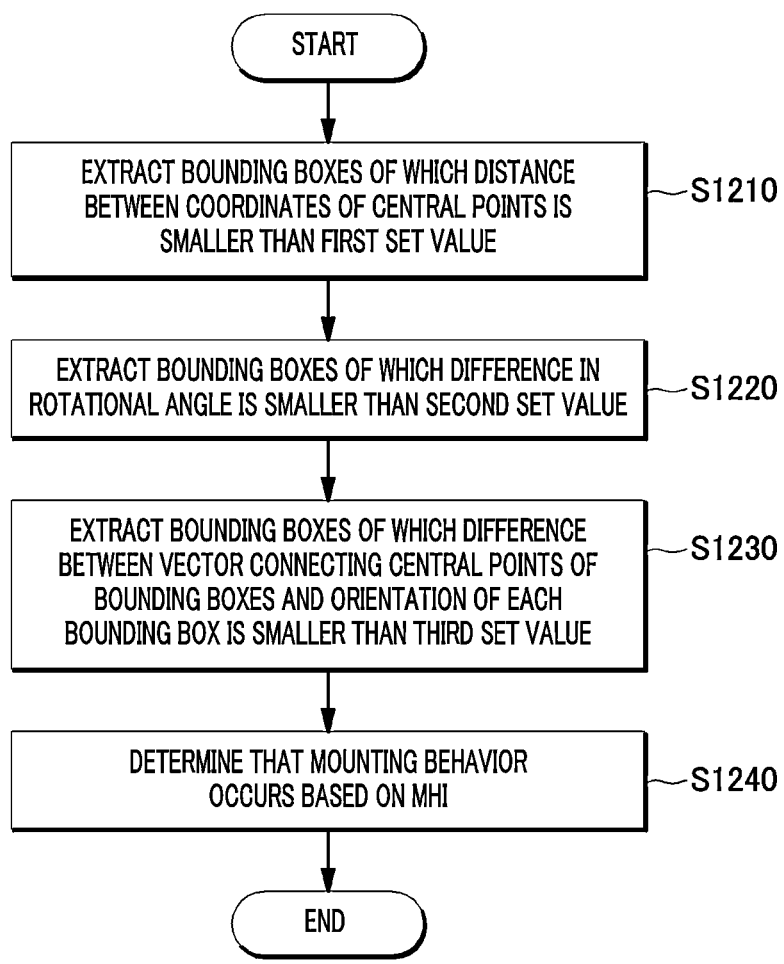
FIG. 12 is a flowchart illustrating a method for detecting mounting behavior from the animal detection information according to an embodiment of the present disclosure.
Figure 13:
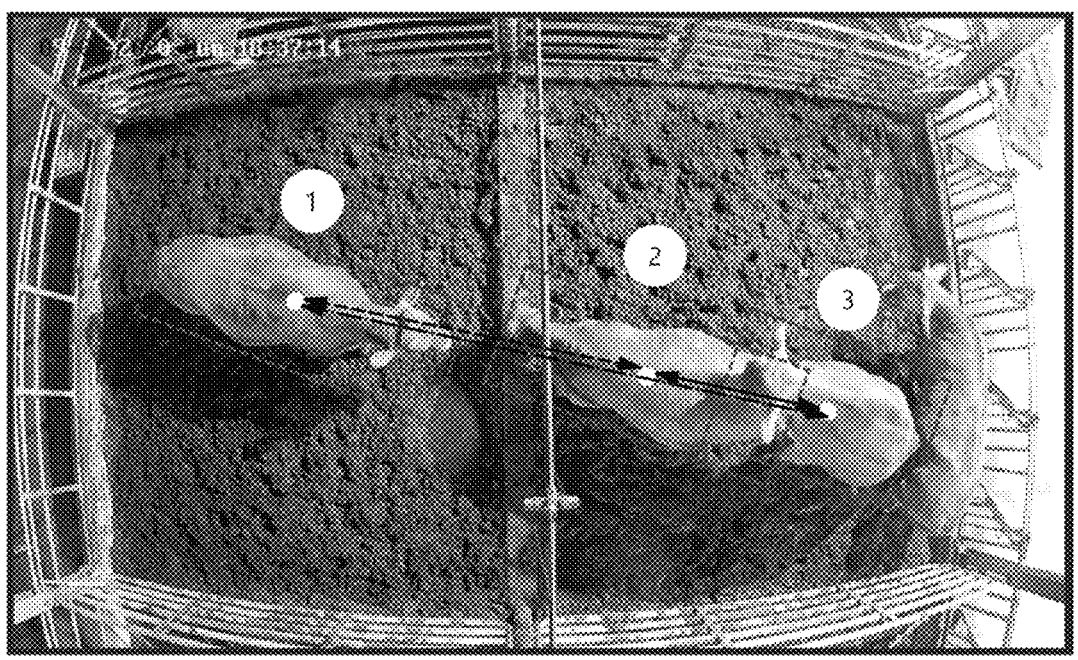
FIG. 13 through FIG. 15 are provided to explain a process of extracting information for detecting mounting behavior from a bounding box according to an embodiment of the present disclosure.
Figure 14:
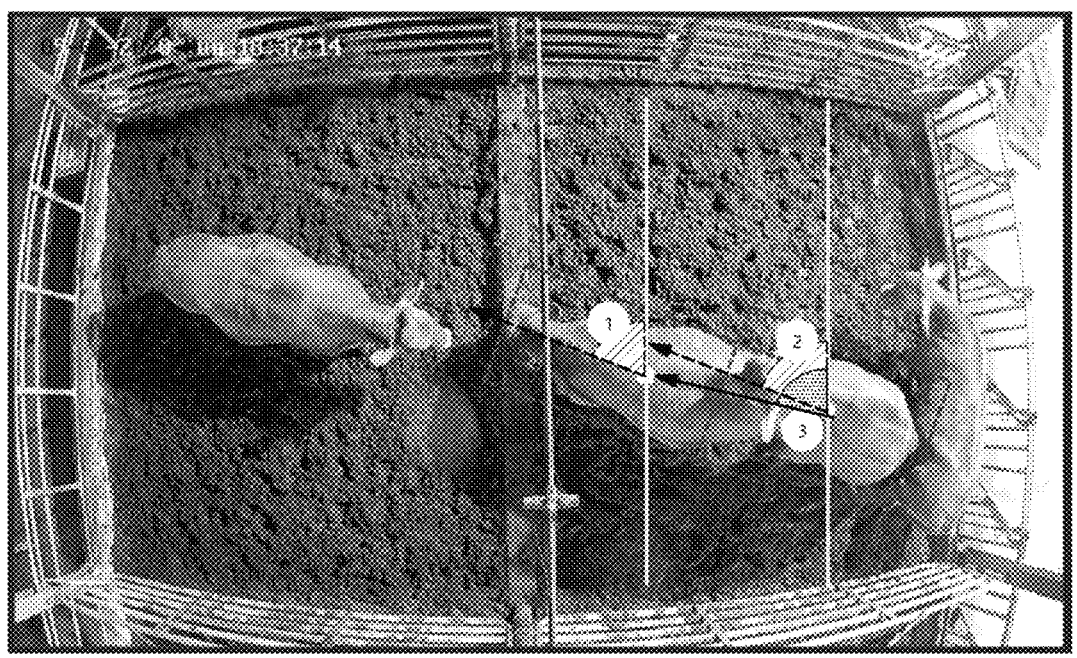
Figure 15:
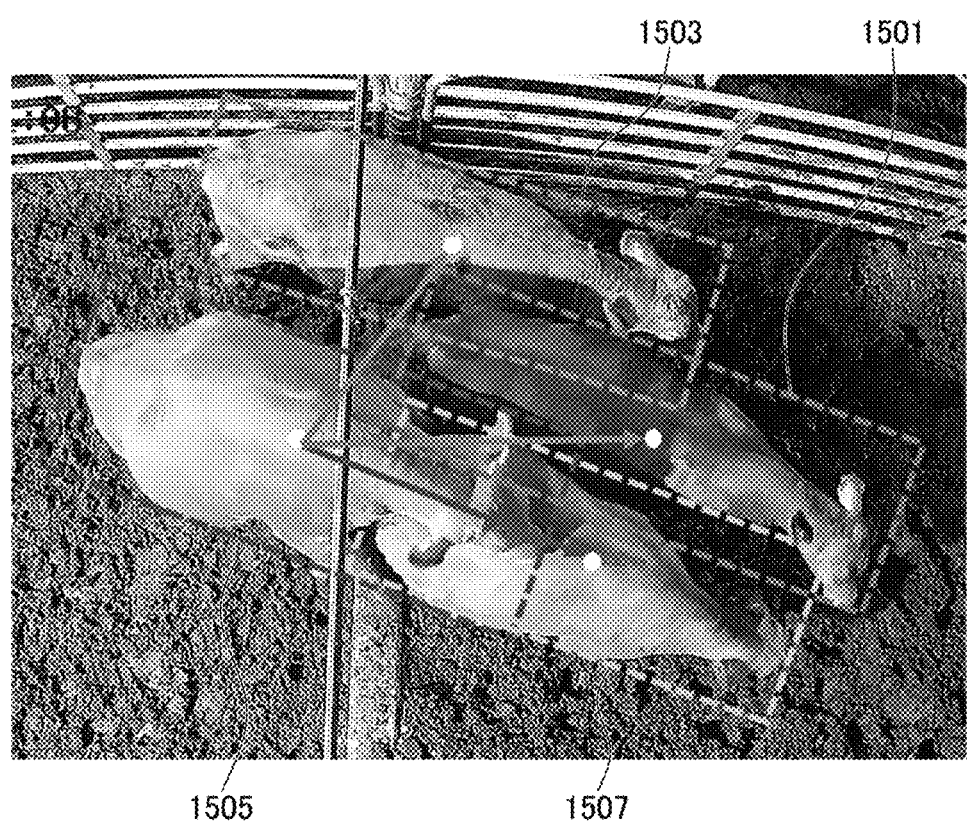

FIG. 12 is a flowchart illustrating a method for detecting mounting behavior from the animal detection information according to an embodiment of the present disclosure, FIG. 13 through FIG. 15 are provided to explain a process of extracting information for detecting mounting behavior from a bounding box according to an embodiment of the present disclosure, and FIG. 16 through FIG. 21 are provided to explain a process of extracting activity information of an animal object based on a motion history image (MHI) according to an embodiment of the present disclosure.

First, bounding boxes of which a distance between coordinates of central points is smaller than a first set value are extracted from a received image (S1210).

FIG. 13 illustrates a process of detecting mounting behavior based on a distance between coordinates of central points of bounding boxes.

Herein, the Euclidean distance may be used as follows in order to calculate the distance between the coordinates of the central points.

$$\sqrt{(p_1-q_1)^2+(p_2-q_2)^2+\ldots+(p_n-q_n)^2} = \sqrt{\sum_{i=1}^{n}(p_i-q_i)^2}$$

As shown in FIG. 13, if bounding boxes of three animal objects are extracted, it is determined that mounting behavior does not occur between cow 1 and cow 2 of which a distance between coordinates of central points is greater than the first set value. Meanwhile, since a distance between coordinates of central points of cow 2 and cow 3 is smaller than the first set value, it is determined that mounting behavior is highly likely to have occurred. Herein, the first set value is approximately set to half or less of the length from the head to the tail of a cow in the viewing angle of a cow, but this can be changed depending on an embodiment and does not limit the scope of the present disclosure.

Then, bounding boxes of which a difference in rotational angle is smaller than a second set value are extracted from the extracted bounding boxes (S1220).

In this case, a high likelihood that two cows doing mounting behavior look toward an almost identical direction due to features of mounting behavior of cows is used. In order to check how much identical direction the two cows are looking by comparing head direction vectors (Lx2-Xc, Ly2-Yc) of the two cows defined by the bounding boxes, it is checked whether a difference in rotational angle between the bounding boxes with respect to reference axes is smaller than the second set value. Herein, the second set value is approximately in the range of 15° to 45°, but this can be changed depending on an embodiment and does not limit the scope of the present disclosure.

Referring to a photo in FIG. 14, the angle of cow 1 and the angle of cow 2 are values extracted from the respective bounding boxes. It is checked whether a difference in angle between the cows is smaller than the second set value.

Meanwhile, FIG. 15 shows that there may be a cow not involved in mounting behavior among cows of which a distance between coordinates of central points of bounding boxes is smaller than the first set value and a difference in rotational angle between the bounding boxes is smaller than the second set value.

That is, the cow in the bounding box 1501 or bounding box 1503 is not involved in mounting behavior with the cow in the bounding box 1505, but is in a state where a distance between coordinates of the central points is smaller than the first set value and a difference in rotational angle between the bounding boxes is smaller than the second set value.

In order to detect this case, a vector connecting the central points of the respective bounding boxes is used in a subsequent process.

That is, bounding boxes of which a difference between a vector connecting the central points of the extracted bounding boxes and an orientation of each bounding box is smaller than a third set value are extracted (S1230). As the vector connecting the central points of the extracted bounding boxes, a vector indicated by a solid line in FIG. 14 is extracted, and if a difference between this vector and a rotational angle of each bounding box is smaller than the third set value, it is determined that mounting behavior occurs.

Through this process, the cow in the bounding box 1501 or bounding box 1503 in FIG. 15 is in a state where a vector connecting the central points and a rotational angle of each bounding box is greater than the third set value, and, thus, it is determined that mounting behavior does not occur. Herein, the third set value is approximately in the range of 15° to 45°, but this can be changed depending on an embodiment and does not limit the scope of the present disclosure.

Thereafter, if activity information of the animal object is extracted based on a motion history image (MHI) of the image from which the extracted bounding boxes are detected, it is determined that mounting behavior occurs in an animal object specified by the bounding boxes (S1240).

Figure 16:
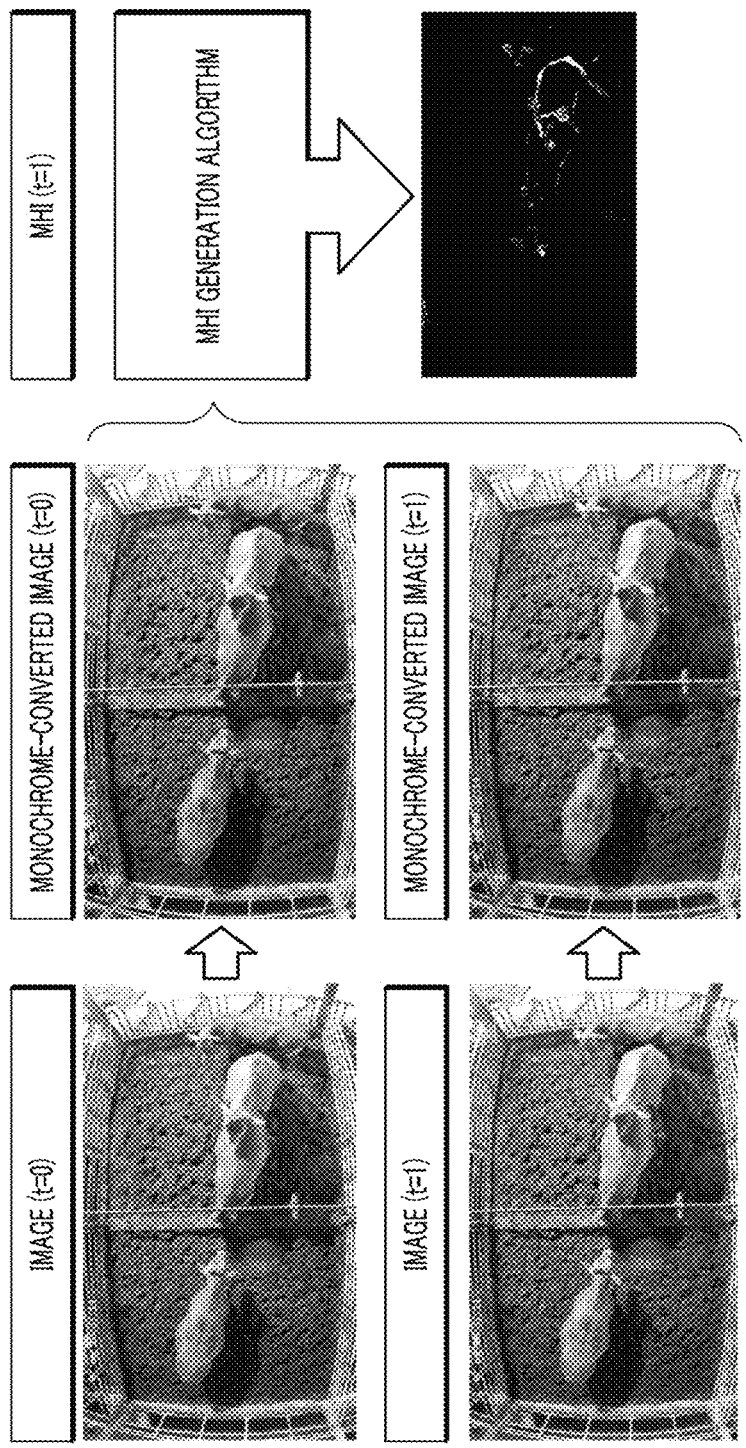
FIG. 16 through FIG. 21 are provided to explain a process of extracting activity information of an animal object based on a motion history image (MHI) according to an embodiment of the present disclosure.

First, referring to FIG. 16, images are sequentially converted into monochrome images according to a time point of input.

Figure 17:
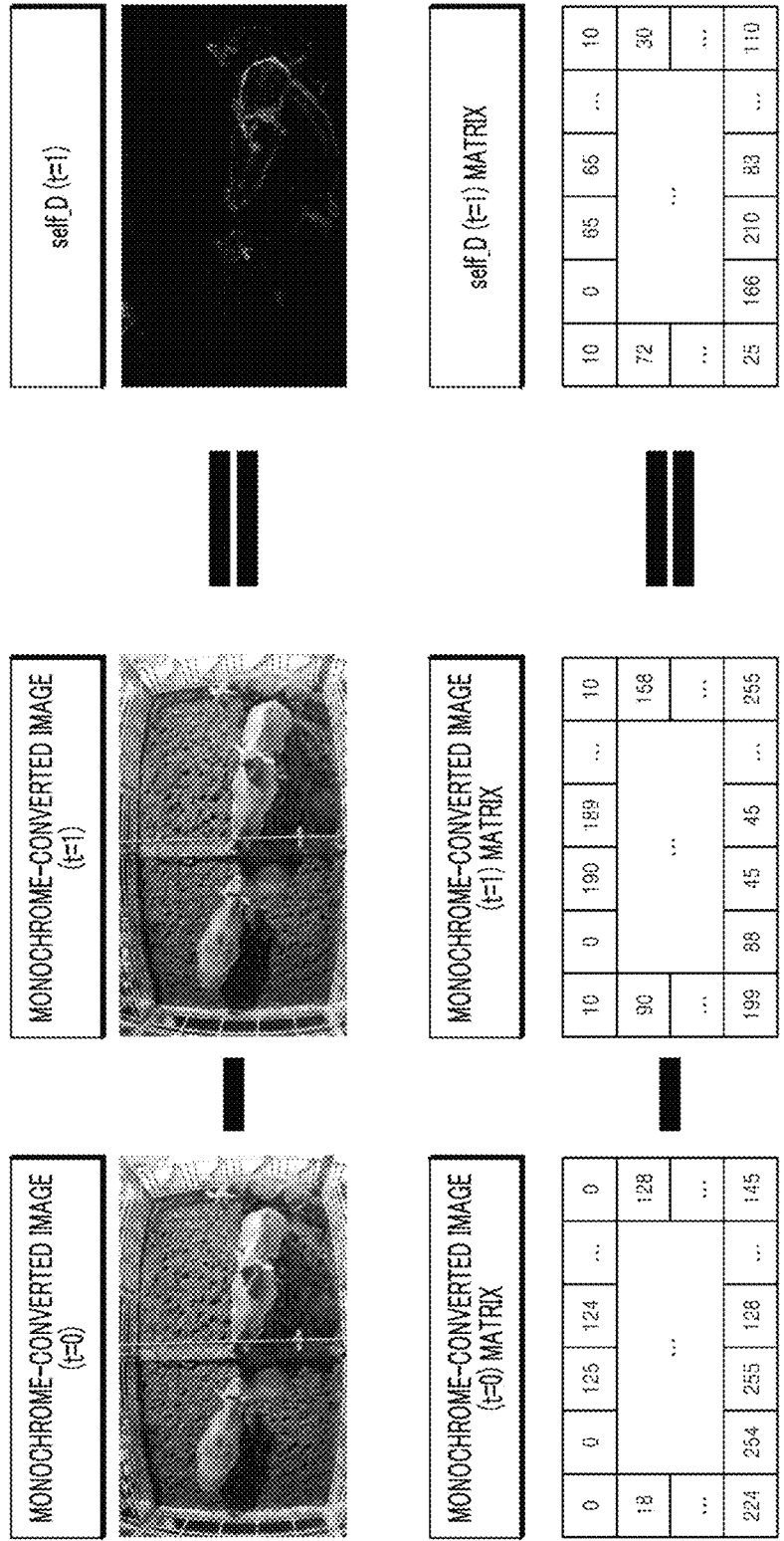

Then, as shown in FIG. 17, a difference in pixel brightness between an image converted into a monochrome image at a time point t-1 (t is a natural number of 1 or more) and the image converted into a monochrome image at a time point t is calculated for each pixel. Herein, the difference in pixel brightness is represented by an absolute value, and a negative number is converted into a positive one.

Figure 18:
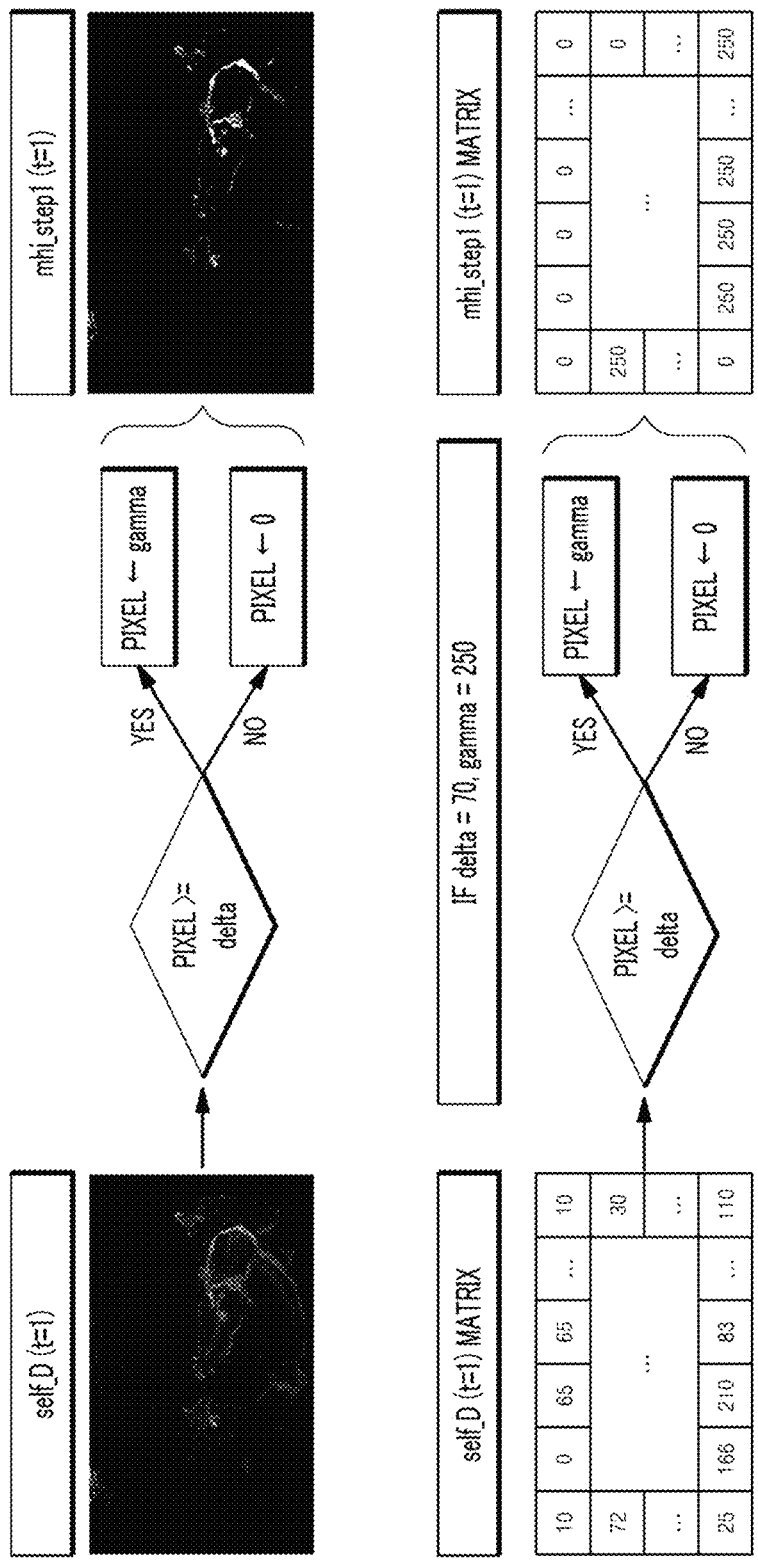

Thereafter, as shown in FIG. 18, when the calculated difference in pixel brightness is equal to or greater than a fifth set value (delta), a corresponding pixel value is converted into an upper limit (gamma), and when the calculated difference in pixel brightness is smaller than the fifth set value, a corresponding pixel value is converted into a lower limit (for example, 0) to sequentially generate difference images (mhi_step) for the time point t.

Figure 19:
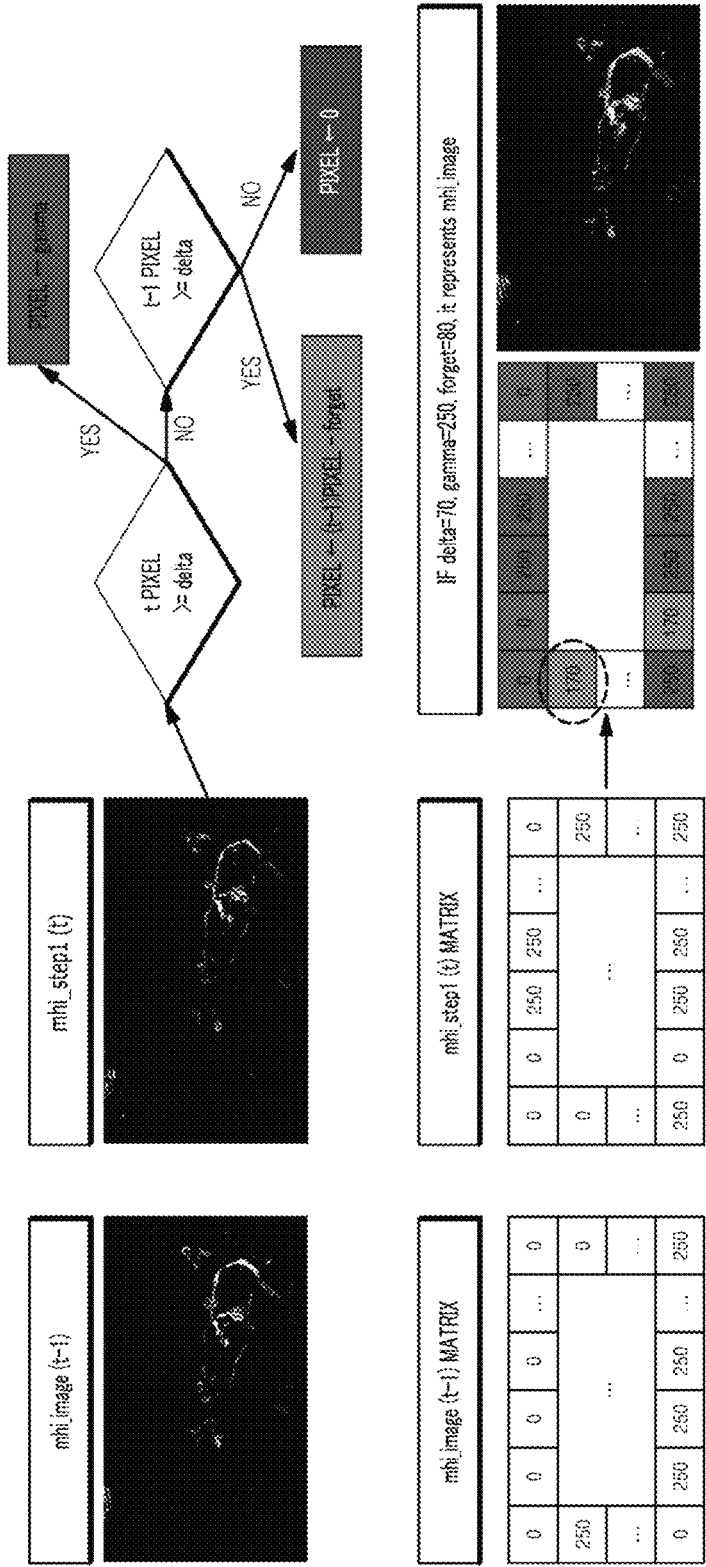

Then, as shown in FIG. 19, when a difference between a pixel brightness of a difference image for a time point t+1 and a pixel brightness of a difference image for the time point t is equal to or greater than the fifth set value (delta), a corresponding pixel value is converted into the upper limit (gamma).

When a difference between a pixel brightness of a difference image for a time point t+1 and a pixel brightness of a difference image for the time point t is smaller than the fifth set value and the pixel brightness of the difference image for the time point t is equal to or greater than the fifth set value, a difference between the pixel brightness of the difference image for the time point t and a sixth set value (forget) is stored as a corresponding pixel value.

Further, when a difference between a pixel brightness of a difference image for a time point t+1 and a pixel brightness of a difference image for the time point t is smaller than the fifth set value and the pixel brightness of the difference image for the time point t is smaller than the fifth set value, the pixel brightness of the difference image for the time point t is converted into the lower limit to generate each MHI for the time point t+1.

Figure 20:
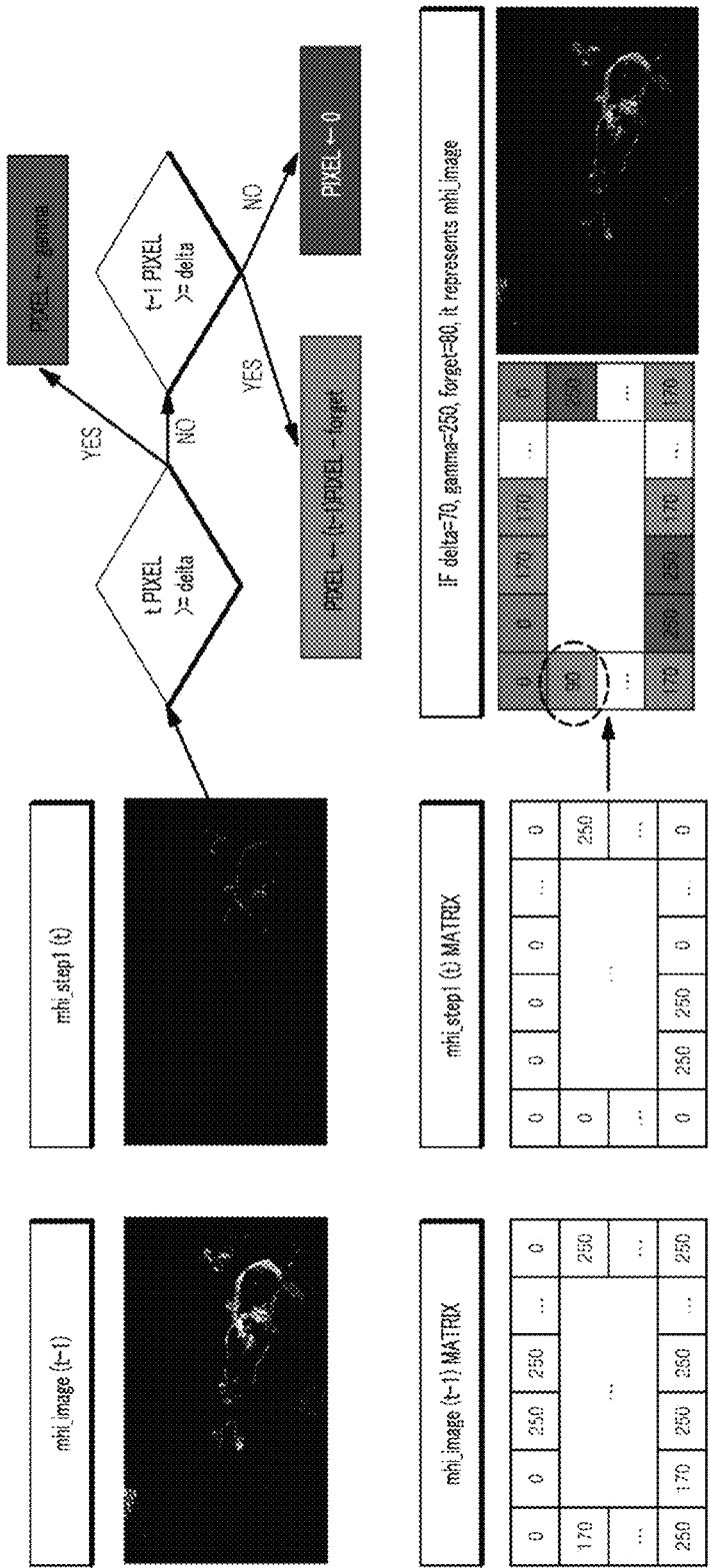

For example, as for pixels indicated by a dotted circle in FIG. 19 and FIG. 20, it can be seen that a pixel corresponding to the lower limit is input consecutively twice, the pixel brightness is subtracted by the sixth set value twice (250−80−80=90).

Figure 21:
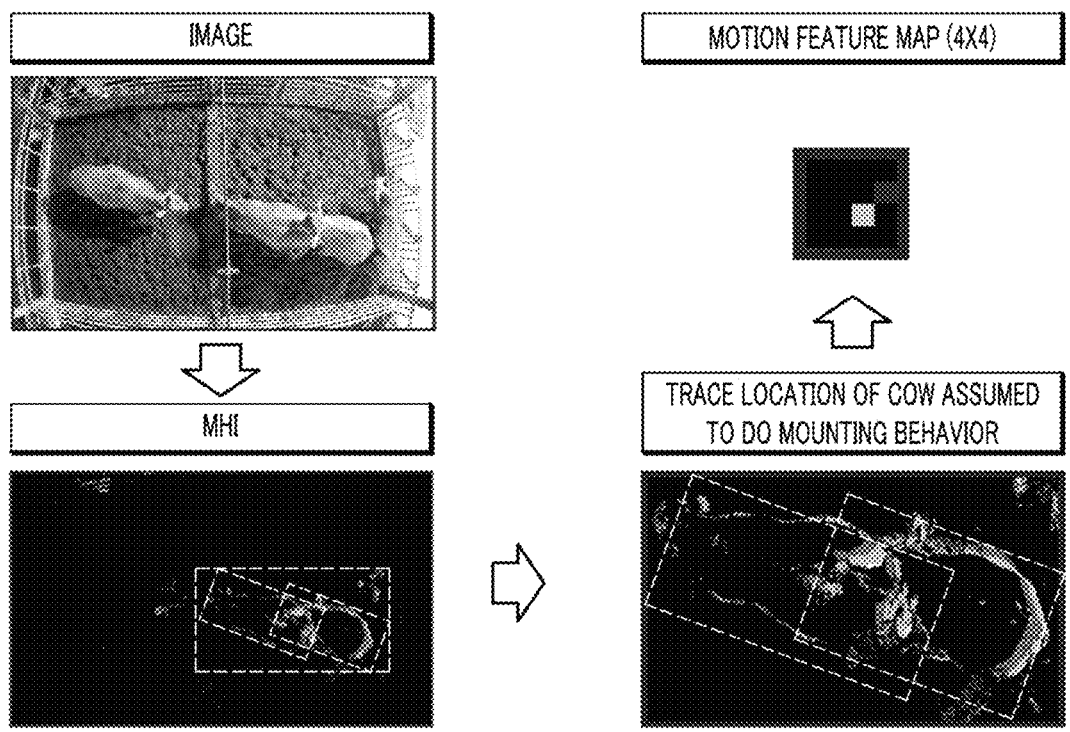

FIG. 21 shows a summary of the process of generating MHI.

The size of an image may be adjusted in order for an MHI to include all of bounding boxes. That is, coordinates of an uppermost edge and coordinates of a lowermost edge of a bounding box may be acquired to adjust the size of an image and may be input into a conventionally known feature map extraction algorithm to extract a feature map from an MHI.

Hereinafter, a decision tree-based mounting behavior detection model will be described as a second method for detecting mounting behavior.

Figure 22:
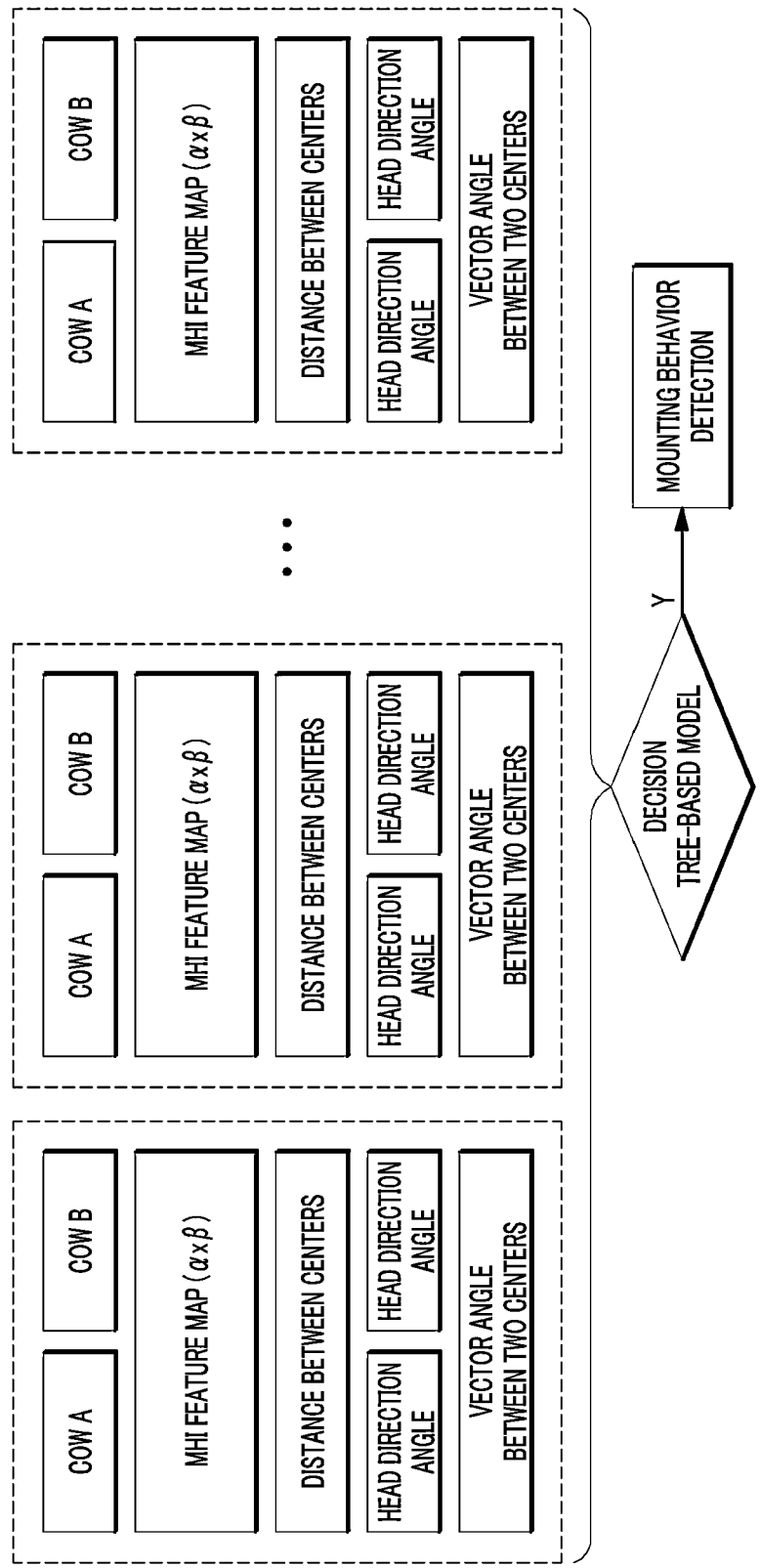
FIG. 22 is provided to explain a decision tree-based mounting behavior detection model according to an embodiment of the present disclosure.

FIG. 22 is provided to explain a decision tree-based mounting behavior detection model according to an embodiment of the present disclosure.

As shown in FIG. 22, the mounting behavior detection model is trained to detect mounting behavior based on learning data including a distance between the coordinates of the central points of the bounding boxes, rotational angles of the bounding boxes, a vector connecting the central points of the bounding boxes and activity information of the animal object based on a motion history image (MHI) of the image from which the bounding boxes are detected.

Herein, the methods of calculating the distance between the coordinates of the central points of the bounding boxes, the rotational angles of the bounding boxes and the vector connecting the central points of the bounding boxes and the process of extracting the activity information of the animal object based on the MHI are the same as described above with reference to FIG. 13 through FIG. 21.

However, the decision tree-based mounting behavior detection model collects a plurality of learning data described above and performs machine learning based on the collected learning data. According to the second method unlike the first method, mounting behavior can be detected directly based on the decision tree-based model without sequentially performing the processes.

In a modification example, a distance between the nose and the center or a distance between the neck and the center can be used instead of a distance between the centers of cows.

Also, an MHI gradient map can be used. As long as the intensity of a motion can be found through the MHI, it is possible to perceive the direction of activity of the animal object using the gradient map and thus possible to more accurately detect mounting behavior.

The method for detecting mounting behavior of an animal object described above can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

It would be understood by a person with ordinary skill in the art that various changes and modifications may be made based on the above description without changing technical conception and essential features of the present disclosure. Thus, it is clear that the above-described embodiments are illustrative in all aspects and do not limit the present disclosure. The scope of the present disclosure is defined by the following claims. It shall be understood that all modifications and embodiments conceived from the meaning and scope of the claims and their equivalents are included in the scope of the present disclosure.

EXPLANATION OF REFERENCE NUMERALS

100: Apparatus for detecting mounting behavior of an animal object based on an image
110: Communication module
120: Memory
130: Processor
140: Database

We claim:

1. An apparatus for detecting mounting behavior of an animal object based on an image, comprising:
   a communication module that receives an image of a target object;
   a memory that stores therein a program configured to detect mounting behavior of an animal object from the received image; and
   a processor that executes the program,
   wherein the program configured to detect mounting behavior extracts animal detection information about an animal object detected from the image by inputting the received image into an animal detection model that is trained based on learning data composed of animal images, and the animal detection information includes a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body, and
   the program extracts, from the received image, bounding boxes of which a distance between the coordinates of the central points is smaller than a first set value, from the extracted bounding boxes, bounding boxes of which a difference in rotational angle is smaller than a second set value, and bounding boxes of which a difference between a vector connecting the central points of the extracted bounding boxes and an orientation of each bounding box is smaller than a third set value, and
   if activity information of the animal object is extracted based on a motion history image (MHI) of the image from which the extracted bounding boxes are detected, it is determined that mounting behavior occurs in an animal object specified by the bounding boxes, and
   wherein to extract the activity information of the animal object based on the MHI, the program configured to detect mounting behavior performs:
   a process of sequentially generating difference images for a time point t (t is a natural number of 1 or more) by calculating a difference in pixel brightness between an image converted into a monochrome image at a time point t−1 and an image converted into a monochrome image at the time point t for each pixel, converting a corresponding pixel value into an upper limit when the calculated difference in pixel brightness is equal to or greater than a fifth set value and converting a corresponding pixel value into a lower limit when the calculated difference in pixel brightness is smaller than the fifth set value;
   a process of converting a corresponding pixel value into the upper limit when a difference between a pixel brightness of a difference image for a time point t+1 and a pixel brightness of a difference image for the time point t is equal to or greater than the fifth set value;
   a process of storing a difference between a pixel brightness of a difference image for the time point t and a sixth set value as a corresponding pixel value when a difference between a pixel brightness of a difference image for a time point t+1 and the pixel brightness of the difference image for the time point t is smaller than the fifth set value and the pixel brightness of the difference image for the time point t is equal to or greater than the fifth set value;
   a process of converting a pixel brightness of a difference image for the time point t into the lower limit to generate each MHI for the time point t+1 when a difference between a pixel brightness of a difference image for a time point t+1 and the pixel brightness of the difference image for the time point t is smaller than the fifth set value and the pixel brightness of the difference image for the time point t is smaller than the fifth set value; and
   a process of extracting a feature map from each MHI.

2. The apparatus for detecting mounting behavior of claim 1,
   wherein the animal detection model is constructed based on learning data in which a plurality of images including at least one animal object is matched with the animal detection information about animal objects included in each image, and
   the animal detection model includes a backbone configured to extract a feature from the input image, a neck configured to collect intermediate information from each layer of the backbone based on the feature extracted by the backbone, and a head configured to output the animal detection information based on the intermediate information collected by the neck.

3. The apparatus for detecting mounting behavior of claim 2, wherein the head of the animal detection model extracts a bounding box of the animal object and a keypoint of the animal object based on cascaded multi-lane deep convolutional networks and extracts each of information about the class of the animal object and information about a pose of the animal object based on a single-lane deep convolutional network, and the cascaded multi-lane deep convolutional networks are constructed to perform a process of extracting coordinates of a major keypoint, a process of extracting a direction of a tangent line passing through the coordinates of the major keypoint and a process of extracting a width and a height of an area including the tangent line and the major keypoint.

4. An apparatus for detecting mounting behavior of an animal object based on an image, comprising:

a communication module that receives an image of a target object;

a memory that stores therein a program configured to detect mounting behavior of an animal object from the received image; and a processor that executes the program, wherein the program configured to detect mounting behavior extracts animal detection information about an animal object detected from the image by inputting the received image into an animal detection model that is trained based on learning data composed of animal images, and the animal detection information includes a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body, and the program detects mounting behavior by inputting the extracted animal detection information into a decision tree-based mounting behavior detection model, and the mounting behavior detection model is trained to detect mounting behavior based on learning data including a distance between the coordinates of the central points of the bounding boxes, rotational angles of the bounding boxes, a vector connecting the central points of the bounding boxes and activity information of the animal object based on a motion history image (MHI) of the image from which the bounding boxes are detected, and wherein to extract the activity information of the animal object based on the MHI, the program configured to detect mounting behavior performs:

a process of sequentially generating difference images for a time point t (t is a natural number of 1 or more) by calculating a difference in pixel brightness between an image converted into a monochrome image at a time point t−1 and an image converted into a monochrome image at the time point t for each pixel, converting a corresponding pixel value into an upper limit when the calculated difference in pixel brightness is equal to or greater than a fifth set value and converting a corresponding pixel value into a lower limit when the calculated difference in pixel brightness is smaller than the fifth set value;

a process of converting a corresponding pixel value into the upper limit when a difference between a pixel brightness of a difference image for a time point t+1 and a pixel brightness of a difference image for the time point t is equal to or greater than the fifth set value;

a process of storing a difference between a pixel brightness of a difference image for the time point t and a sixth set value as a corresponding pixel value when a difference between a pixel brightness of a difference image for a time point t+1 and the pixel brightness of the difference image for the time point t is smaller than the fifth set value and the pixel brightness of the difference image for the time point t is equal to or greater than the fifth set value;

a process of converting a pixel brightness of a difference image for the time point t into the lower limit to generate each MHI for the time point t+1 when a difference between a pixel brightness of a difference image for a time point t+1 and the pixel brightness of the difference image for the time point t is smaller than the fifth set value and the pixel brightness of the difference image for the time point t is smaller than the fifth set value; and a process of extracting a feature map from each MHI.

5. The apparatus for detecting mounting behavior of claim 4, wherein the animal detection model is constructed based on learning data in which a plurality of images including at least one animal object is matched with the animal detection information about animal objects included in each image, and the animal detection model includes a backbone configured to extract a feature from the input image, a neck configured to collect intermediate information from each layer of the backbone based on the feature extracted by the backbone, and a head configured to output the animal detection information based on the intermediate information collected by the neck.

6. The apparatus for detecting mounting behavior of claim 5, wherein the head of the animal detection model extracts a bounding box of the animal object and a keypoint of the animal object based on cascaded multi-lane deep convolutional networks and extracts each of information about the class of the animal object and information about a pose of the animal object based on a single-lane deep convolutional network, and the cascaded multi-lane deep convolutional networks are constructed to perform a process of extracting coordinates of a major keypoint, a process of extracting a direction of a tangent line passing through the coordinates of the major keypoint and a process of extracting a width and a height of an area including the tangent line and the major keypoint.

7. A method for detecting mounting behavior of an animal object by using an apparatus for detecting mounting behavior of an animal object based on an image, comprising:

a process of extracting animal detection information by inputting an image of a target object into an animal detection model that is trained based on learning data composed of animal images, the animal detection information including a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body;

a process of extracting, from the received image, bounding boxes of which a distance between the coordinates of the central points is smaller than a first set value;

a process of extracting, from the extracted bounding boxes, bounding boxes of which a difference in rotational angle is smaller than a second set value;

a process of extracting bounding boxes of which a difference between a vector connecting the central points of the extracted bounding boxes and an orientation of each bounding box is smaller than a third set value; and a process of extracting activity information of the animal object based on a motion history image (MHI) of the image from which the extracted bounding boxes are detected, and if the activity information of the animal object is extracted, it is determined that mounting behavior occurs in an animal object specified by the bounding boxes, and wherein the process of extracting activity information of the animal object based on MHI includes:

a process of sequentially generating difference images for a time point t (t is a natural number of 1 or more) by calculating a difference in pixel brightness between an image converted into a monochrome image at a time point t−1 and an image converted into a monochrome image at the time point t for each pixel, converting a corresponding pixel value into an upper limit when the calculated difference in pixel brightness is equal to or greater than a fifth set value and converting a corresponding pixel value into a lower limit when the calculated difference in pixel brightness is smaller than the fifth set value;

a process of converting a corresponding pixel value into the upper limit when a difference between a pixel brightness of a difference image for a time point t+1 and a pixel brightness of a difference image for the time point t is equal to or greater than the fifth set value;

a process of storing a difference between a pixel brightness of a difference image for the time point t and a sixth set value as a corresponding pixel value when a difference between a pixel brightness of a difference image for a time point t+1 and the pixel brightness of the difference image for the time point t is smaller than the fifth set value and the pixel brightness of the difference image for the time point t is equal to or greater than the fifth set value;

a process of converting a pixel brightness of a difference image for the time point t into the lower limit to generate each MHI for the time point t+1 when a difference between a pixel brightness of a difference image for a time point t+1 and the pixel brightness of the difference image for the time point t is smaller than the fifth set value and the pixel brightness of the difference image for the time point t is smaller than the fifth set value; and a process of extracting a feature map from each MHI.

8. A non-transitory computer-readable recording medium that stores therein a computer program configured to perform a method for detecting mounting behavior of an animal object based on an image of claim 7.

9. A method for detecting mounting behavior of an animal object by using an apparatus for detecting mounting behavior of an animal object based on an image, comprising:

a process of extracting animal detection information by inputting an image of a target object into an animal detection model that is trained based on learning data composed of animal images, the animal detection information including a bounding box created to be suitable for the animal object, coordinates of a central point of the bounding box, a width of the bounding box, a length of the bounding box, a rotational angle of the bounding box with respect to a reference axis, a position of the end of the head of the animal object, a position of the neck and a position of the end of the body; and a process of detecting mounting behavior by inputting the extracted animal detection information into a decision tree-based mounting behavior detection model, wherein the mounting behavior detection model is trained to detect mounting behavior based on learning data including a distance between the coordinates of the central points of the bounding boxes, rotational angles of the bounding boxes, a vector connecting the central points of the bounding boxes and activity information of the animal object based on a motion history image (MHI) of the image from which the bounding boxes are detected, and wherein to extract the activity information of the animal object based on the MHI, the mounting behavior detection model performs:

a process of sequentially generating difference images for a time point t (t is a natural number of 1 or more) by calculating a difference in pixel brightness between an image converted into a monochrome image at a time point t−1 and an image converted into a monochrome image at the time point t for each pixel, converting a corresponding pixel value into an upper limit when the calculated difference in pixel brightness is equal to or greater than a fifth set value and converting a corresponding pixel value into a lower limit when the calculated difference in pixel brightness is smaller than the fifth set value;

a process of converting a corresponding pixel value into the upper limit when a difference between a pixel brightness of a difference image for a time point t+1 and a pixel brightness of a difference image for the time point t is equal to or greater than the fifth set value;

a process of storing a difference between a pixel brightness of a difference image for the time point t and a sixth set value as a corresponding pixel value when a difference between a pixel brightness of a difference image for a time point t+1 and the pixel brightness of the difference image for the time point t is smaller than the fifth set value and the pixel brightness of the difference image for the time point t is equal to or greater than the fifth set value;

a process of converting a pixel brightness of a difference image for the time point t into the lower limit to generate each MHI for the time point t+1 when a difference between a pixel brightness of a difference image for a time point t+1 and the pixel brightness of the difference image for the time point t is smaller than the fifth set value and the pixel brightness of the difference image for the time point t is smaller than the fifth set value; and a process of extracting a feature map from each MHI.

10. A non-transitory computer-readable recording medium that stores therein a computer program configured to perform a method for detecting mounting behavior of an animal object based on an image of claim 9.

* * * * *